INVENTORS
Hans Joachim Stock
Gerhard Stokmal
Johannes Schmack
BY Michael S. Striker
ATTORNEY INVENTORS
Hans Joachim Stock
Gerhard Schmidt
Johannes Schumak
BY Michael S. Striker
ATTORNEY Inventors
Hans Joachim Stock
Gerhard Schmidt
Johannes Schnacke
by Michael S. Striker
Atty INVENTORS:
HANS-JOACHIM Stock
GERHARD SCHMIDT
JOHANNES SCHUNACK
By: Michael S. Striker
Attorney

INVENTORS:
HANS-JOACHIM STOCK
GERHARD STOCK
JOHANNES SCHUNACK

By: Michael S. Striker
Attorney

United States Patent Office 3,555,852
Patented Jan. 19, 1971

3,555,852

METHOD AND APPARATUS FOR RECORDING A PROGRAM REPRESENTING A SAMPLE PATTERN

Hans Joachim Stock, Freiburg im Breisgau, Gerhard Schmidt, Stuttgart-Vaihingen, and Johannes Schunack, Berlin-Lichterfeld, Germany, assignors to Franz Morat GmbH, Stuttgart-Vaihingen, Germany Filed Dec. 12, 1966, Ser. No. 601,179
Claims priority, application Germany, Dec. 11, 1965, M 67,609
Int. Cl. D04b 37/02
U.S. Cl. 66—1 9 Claims

ABSTRACT OF THE DISCLOSURE

Information regarding color or other distinguishable characteristics of areas of a sample pattern is automatically transformed into recordings on a record carrier which represent by the position thereof the different characteristics of the areas of the sample pattern when read-out during the operation of a textile machine controlled by the record carrier.

CROSS-REFERENCE TO A RELATED APPLICATION

An application assigned to the same assignee for an "Apparatus and Method for Translating Color Information of a Pattern into Impulses" Ser. No. 601,204 is simultaneously filed by Johannes Schunack on Dec. 12, 1966, now abandoned.

BACKGROUND OF THE INVENTION

The present invention relates to the recording of information on a record carrier, and more particularly to the automatic recording on a program tape by punches or other recording means so that a textile machine can be controlled by the program tape to produce a textile fabric whose fabric elements correspond to a sample pattern showing the desired design of the textile fabrics.

It is known to use a program tape for controlling the operations of a knitting machine, for example for controlling the needle operations of a circular knitting machine. Program tapes are particularly suited for machines which produce pictures or patterns on sheet material, such as paper, and knitted or woven fabrics. The pattern of the product may be characterized by different colors and/or relief. The recordings are either punched holes, or light permeable, or electrically conductive. The program tape is mechanically or electronically sensed, so that impulses are produced which control mechanical or electromagnetic selection devices of the machine, or example, an electromagnet selecting certain needles of a knitting machine for operation.

A sample pattern is used which shows the picture of the desired design which is then produced by the machine on the fabric.

In accordance with the prior art, the design appearing, for example, in different colors on a sample pattern, is transferred by a manual operation to the program tape, for example by punching holes.

This method of making a program tape is time consuming, and errors are unavoidable so that the actually produced design of the fabric is not exactly the same as the design of the sample pattern.

SUMMARY OF THE INVENTION

It is one object of the invention to automatically transfer the design of a sample pattern to a record carrier in such an order that a machine controlled by the recordings of the record carrier, will produce the design of the sample pattern.

Another object of the invention is to transfer the multicolored design of a sample pattern having areas of different colors arranged in columns and lines, to a record carrier in the form of recordings which by their location on the record carrier, represent the design of the sample pattern.

With these objects in view, the present invention relates to a method for automatically transferring information regarding color or other distinguishable characteristics of areas of a sample pattern into information recorded on a record carrier which is adapted to control a machine to form elements of a patterned sheet. The method comprises the steps of successively sensing series of areas of the sample pattern, and automatically transforming the sensed information into recordings disposed on a record carrier in the sequence in which the machine is adapted to produce elements of a design. Consequently, the elements of the design produced by the machine are disposed in the same pattern as the areas of the sample pattern when the machine is controlled by the record carrier. For example, a fabric may be knitted by the machine whose stitches are made of yarns of different colors in such a manner that the design of the colored stitches is the same as the design of the colored areas of the sample pattern.

The present invention also relates to an apparatus for automatically recording a program representing a sample pattern having a plurality of areas composed of a number of different sets of like areas, the areas of said sets having different distinguishable characteristics and following each other in a predetermined pattern sequence to form the design of the sample pattern.

One embodiment of the invention comprises sensing means for sensing the areas of the sample pattern and producing different control impulses when sensing areas of different sets; supporting means for supporting a record carrier; a series of recording means cooperating with the record carrier; and control means receiving the control impulses and being responsive to the same to operate the recording means to make recordings following each other in the direction in which the record carrier is to be read out. The control means is positioned relative to the record carrier to produce recordings representing by the positions thereof, the different characteristics of the areas which are sensed in the pattern sequence of the design of the sample pattern.

The areas of the sample pattern are arranged in crossing lines and columns, and the sensing means includes a series of sensing elements arranged in the direction of the columns for simultaneously sensing a corresponding series of lines of the sample pattern. The sensing elements are respectively correlated with the recording means, and each recording means includes a number of recording elements equal to the number of sets of areas so that the recording elements of each recording means are respectively associated with the distinguishable characteristics of the sample pattern, for example with the colors of the same. The recording means are spaced in the read-out direction of the record carrier along the same, and the recording elements of each recording means are spaced from each other in a direction transverse to the read-out direction. The arrangement is such that the recording elements and the recordings made by the same which represent the same characteristics, for example colors, are located on parallel tracks of the record carrier extending in the read-out direction, while recordings produced under the control of different sensing elements and recording means are spaced along the tracks.

In accordance with the invention, the recordings on the record carrier must be arranged in a read-out sequence, which is different from the sequence in which the sample pattern is sensed. The sequence of the recordings on the record carrier must be such that a machine controlled by the recorded program on the record carrier, produces a patten identical with the sensed sample pattern.

This will perhaps be best understood with reference to the following example. A sample pattern has differently colored small square areas arranged in columns and lines to represent the wales and courses of a knitted fabric, each stitch of which is to have the same color as the corresponding area of the same pattern. The knitting machine may be a circular knitting machine having 1680 cylinder needles and 24 knitting stations including a yarn carrier, a stitch cam, and selective means for selecting needles for operation or non-operation. The cylinder needles form loops of yarns of different colors supplied at each knitting system by a yarn carrier. Assuming that the four colors white, red, green and blue are used in the design of the sample pattern, four successive knitting stations have a yarn carrier for a white yarn, a yarn carrier for a red yarn, a yarn carrier for a green yarn, and a yarn carrier for a blue yarn, respectively. Each group of four knitting stations forms a row or course of loops so that during each revolution of the knitting cylinder of a machine having 24 knitting stations, 24÷4 rows of loops, which are six rows, are knitted.

The programmed record carrier must have a track for each knitting system so that 24 tracks are provided which are parallel to each other and extend in the read-out direction, for example the longitudinal direction of a program tape. Each track has recordings which influence the knitting machine to operate the needles passing the respective knitting system, or to permit the respective needles to remain idle.

The recordings are also arranged along transverse lines crossing the longitudinal tracks of the record carrier. Consequently, whenever a record carrier line is sensed on the record carrier during the operation of the knitting machine, a signal is given, or not given depending on whether the track associated with the respective system has a recording, or does not have a recording, in the respective record carrier line.

It is known to control the needles electronically by sensing recordings which are light permeable small dots on a record carrier which is not light permeable. Such sensing means may include a photocell excited to produce an impulse when a light beam emitted by a source of light passes through a transparent recording on the program carrier. The sensed impulse is amplified and controls an electromagnetic means which causes movement of the respective needle. The recordings may also be punched, and the manner in which the recordings are made and read out during the operation of the machine is not an object of the invention.

The record carrier having the program in the form of recordings, is moved and sensed in synchronism with the rotation of the needle cylinder and is shifted line by line so that for each needle passing through each knitting system, a control signal is given by a recording, or not given. It follows that 24 recordings will be necessary in each record carrier line in the respective 24 tracks, if 24 needles in all 24 systems are to receive a control impulse. Since when four differently colored yarns are used, four successive knitting systems form a row of loops, and since each record carrier line must have the information required for all 24 knitting systems, and further since during each revolution of the knitting cylinder six rows of loops are made, it is necessary to simultaneously sense 24÷4, which are six lines of the sample pattern in order to produce all recordings required for the simultaneous control of all 24 knitting systems passed by the cylinder needles.

If the periodicity of the sample pattern is 280 needle wales wide, it appears six times in circumferential direction of the tubular fabric knitted on a circular knitting machine having 1680 needle wales. If the periodicity of the pattern is 1680 needle wales wide, then the pattern appears once on the entire circumference on the tubular fabric. If the latter is the case, the sample pattern must be wider than in the first case in which the pattern is twice or several times repeated along the circumference of the tubular knitted fabric. In any event, however, six lines of the sample pattern must be sensed, if four colors are to be used in the design of the knitted fabric.

In the event that six colors are to be used, corresponding to six differently colored yarns, six successive knitting systems are required for knitting a row of loops so that it is necessary to simultaneously sense 24÷6, which are four lines of the sample pattern.

If the theoretical assumption is made that 24 colors are to appear in the knitted fabric, all 24 knitting systems are required for making a row of loops during a revolution, in which event only a single line of the sample pattern is sensed.

This sensing procedure requires during the making of the recordings, a shifting of the record carrier after a column of the sample pattern has been sensed in six lines of the same, for example.

In the preferred embodiment of the invention, in which the record carrier is a tape, the tape is placed about the periphery of a drum so that a section of the tape is supported which has as many record carrier lines as the knitting machine has cylinder needles. In the above example, the supported section of the tape during the recording operation has room for 1680 record carrier lines.

Twenty four recording elements are disposed about the supported section of the tape, spaced from each other in the same manner as the knitting systems are spaced about the circumference of the needle cylinder. Each of the 24 recording elements is associated with a particular color, and if four colors are used, six recording means are provided, each of which has four recording elements respectively associated with the four different colors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figures 3, 3A, 4:
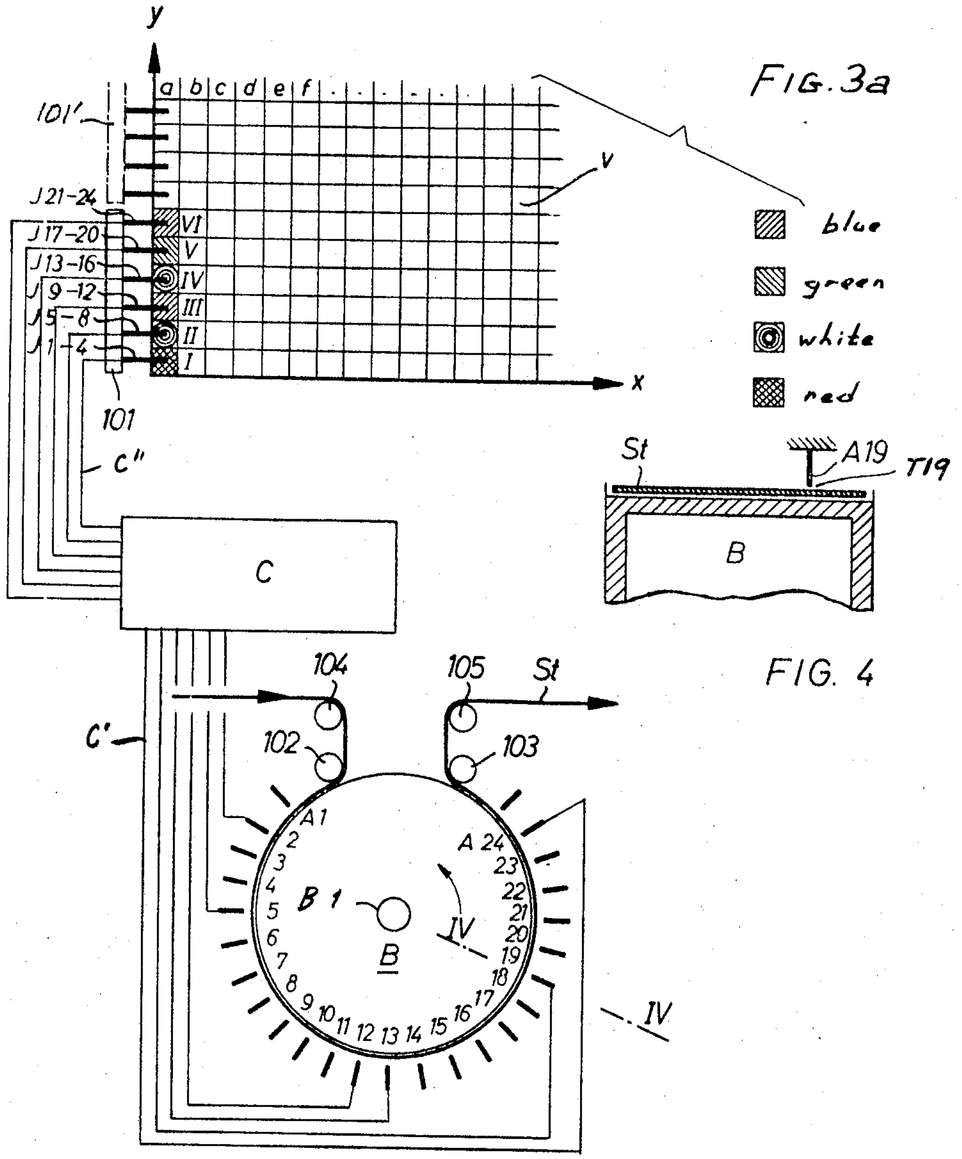
FIG. 3 is a fragmentary schematic view illustrating an embodiment of the invention.
FIG. 3*a* is a schematic illustration showing the manner of representation of different colors in FIG. 3.
FIG. 4 is a fragmentary axial sectional view taken on line IV—IV in FIG. 3.

Referring first to FIGS. 3, 3*a* and 4, six photoelectric sensing means J1–4, J5–8, J9–12, J13–16, J17–20, and J21–24 are mounted on an operating bar 101 in a position for simultaneously sensing six areas of a sample pattern V. The sensed areas are square and arranged in columns *a*, *b*, *c*, *d*, *e*, *f* extending parallel to each other in the direction *y* and crossing parallel lines I to VI extending in the direction X. Each area of the sample pattern has one of the four colors white, red, green, blue, and in connection with FIG. 3*a*, it will be understood that the area in line I is red, the areas in lines II and IV are white, the areas in lines III and VI are blue, and the area in line V is green. Of course, the color of areas of the sample pattern V depends on the design, but in the disclosed embodiment, four colors are used in the design, corresponding to the use of four differently colored yarns in a circular knitting machine which is to be controlled by a program tape whose recordings are made in accordance with the invention.

Figure 5:
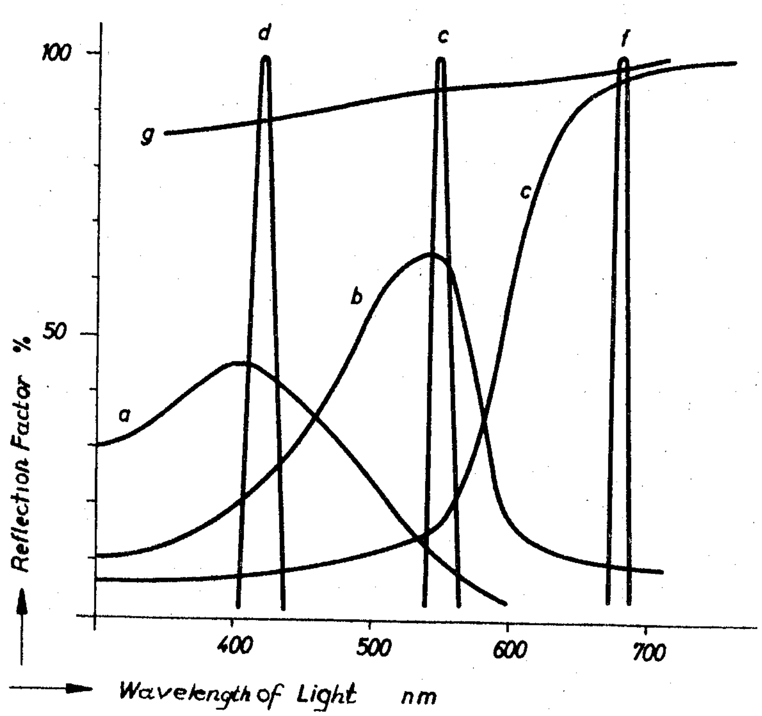
FIG. 5 is a diagram illustrating reflection factors of different colors of a sample pattern.

Each photoelectric sensing means includes a series of four sensing and pulse generating elements in the form of photo cells which are respectively associated with the four colors of the design. For example, sensing means J1–4 has four pulse generating photo cells J1, J2, J3, J4, not shown in the schematic view of FIG. 3, which will respectively respond if the sensed area has the colors white, red, green, or blue. The specific sensing arrangement is not an object of the invention and is described in detail in the above-mentioned related application Ser. No. 606,204. The reflection factors of the colors of the sample pattern depending on the wave length of the light are indicated for the colors blue, green and red by the three graphs *a, b, c* shown in FIG. 5. At 420 nm., the reflection factor of the color blue is a maximum, while the reflection factors of the red and green colors are very small. At the wave length 550 nm., the reflection factor is a maximum for the color green, but small for the other colors. At 680 nm., the reflection factor for the color red is a maximum, and the reflection factors for the other colors practically disappear. Where no colors are provided on the sample pattern, the basic white color of the paper base reflects the white light, and the graph *g* indicates the substantial constant reflection factor of white light.

The sensing is carried out by photocells receiving photo signals reflected by the areas of the sample pattern, and for each color, a color filter is provided whose permeability is a maximum in the regions of the wave length of the light where the reflection factors of the several colors are a maximum, while other colors are hardly reflected.

Graphs *d, e* and *f* represent the light permeability for a blue filter, a green filter and a red filter, respectively. Monochromatic interference filters may be used. Each filter will permit the passage of light of one color within a given range of wave lengths of the light. Where no color is entered on the sample pattern, the light reflected by the white base paper is divided into different colors which pass through all three filters.

Figure 6:
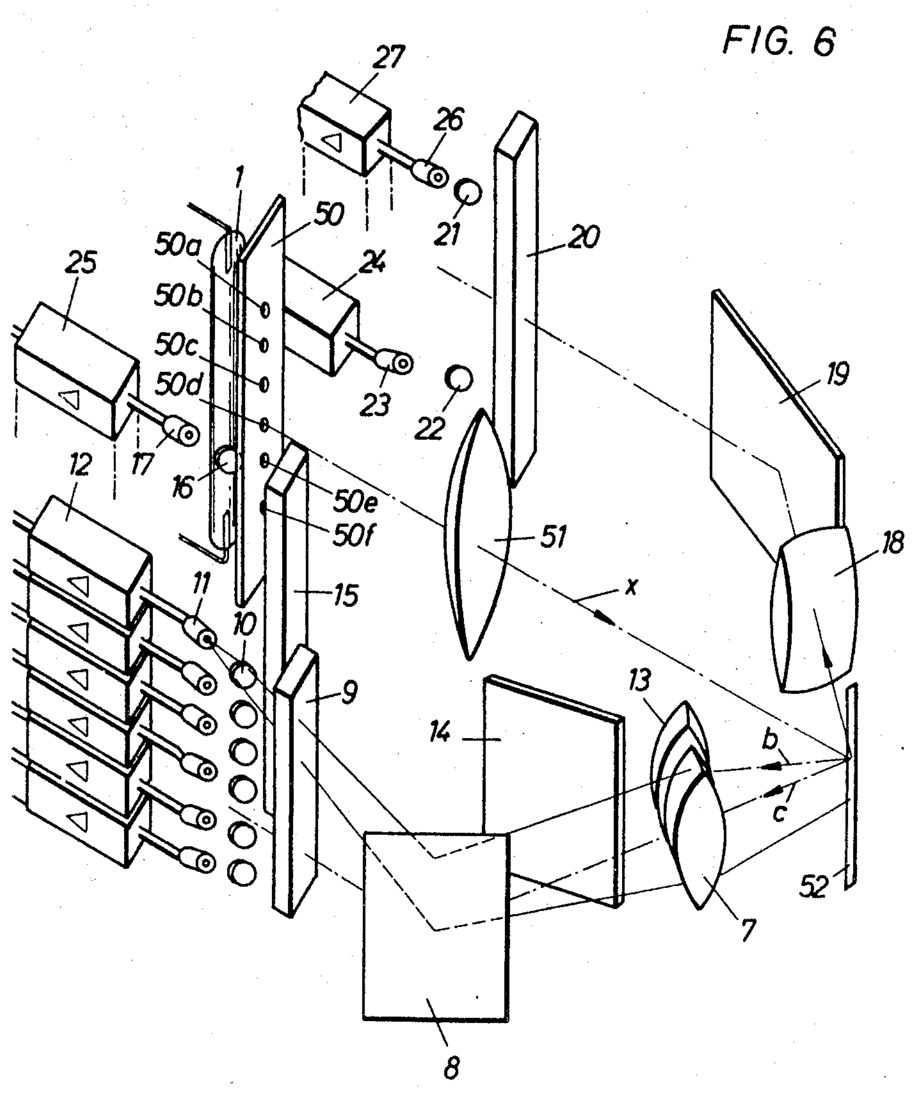
FIG. 6 is a fragmentary perspective view illustrating sensing means for the sample pattern.

The embodiment illustrated in FIG. 6 has an electronic flash device 1 as a source of light. The light passes through a diaphragm 50 which has six perforations 50*a*, 50*b* . . . , and a spherical lens 51, and illuminates the six areas I to VI shown in FIG. 3 so that only these areas, and no other area of the sample pattern V are illuminated.

The illuminated colored areas of the sample pattern V reflect light at different angles toward four sensing elements. A strong photo signal *a* reflected by a blue area passes through a lens 18 to a reflecting mirror 19 where it is reflected to pass through a color filter 20 and a collecting lens 21 into a phototransistor 26 which produces an impulse amplified by an amplifier 27.

A strong photo signal *b* reflected by a green area passes through lens 13, is reflected by reflecting mirror 14 toward the green filter 15 and passes through a collecting lens 16 into a phototransistor 17 which produces an impulse amplified by amplifier 25.

A strong photo signal *c* reflected by a red area passes through lens 7 and is reflected by a reflecting mirror 8 through a red filter 9 through a collecting lens 10 into the phototransistor 11 which produces an impulse amplified by amplifier 12.

The light produced by the source of light 1 is divided by the apertures of diaphragm 50 into six beams which pass through a spherical lens 51 onto the six areas I to VI of the sample pattern, forming circular light dots on the same. The light is reflected and sensed by one of the four phototransistors 11, 17, 23, 26 associated with each sensed area. Only a single light beam *x* is shown in FIG. 6 to pass through an aperture 50*d*. The other five light beams are not shown in FIG. 6 for the sake of simplicity.

A series of six amplifiers and phototransistors is provided for each color, corresponding to the sensing of six areas I to VI shown in FIG. 3. Four colors are used, and the collecting lens 22 is placed to receive the light reflected by a white area and to guide the light into phototransistor 23. When illuminating device 1 produces a flash, six areas of the sample pattern are simultaneously illuminated and six groups of four sensing elements including the four phototransistors 11, 17, 23, 26, respectively, sense the respective color of the illuminated areas. Six control impulses representing colors are produced by the six sensing means and supplied through six of twenty-four lines C″ to an electronic control means C of known construction, which has 24 output lines C′ respectively connected with the 24 lines C″ and connect the same to 24 recording elements of six recording means A1–4, A5–8, A9–12, A13–16, A17–20, and A21–24, each of which includes four recording elements, for example recording elements A1, A2, A3, A4 which are respectively associated with the colors white, red, green and blue. The recording elements A1 to A24 are arranged about the circular periphery of a drum B spaced in circumferential direction almost equal distances, as will be explained later.

Figure 1:
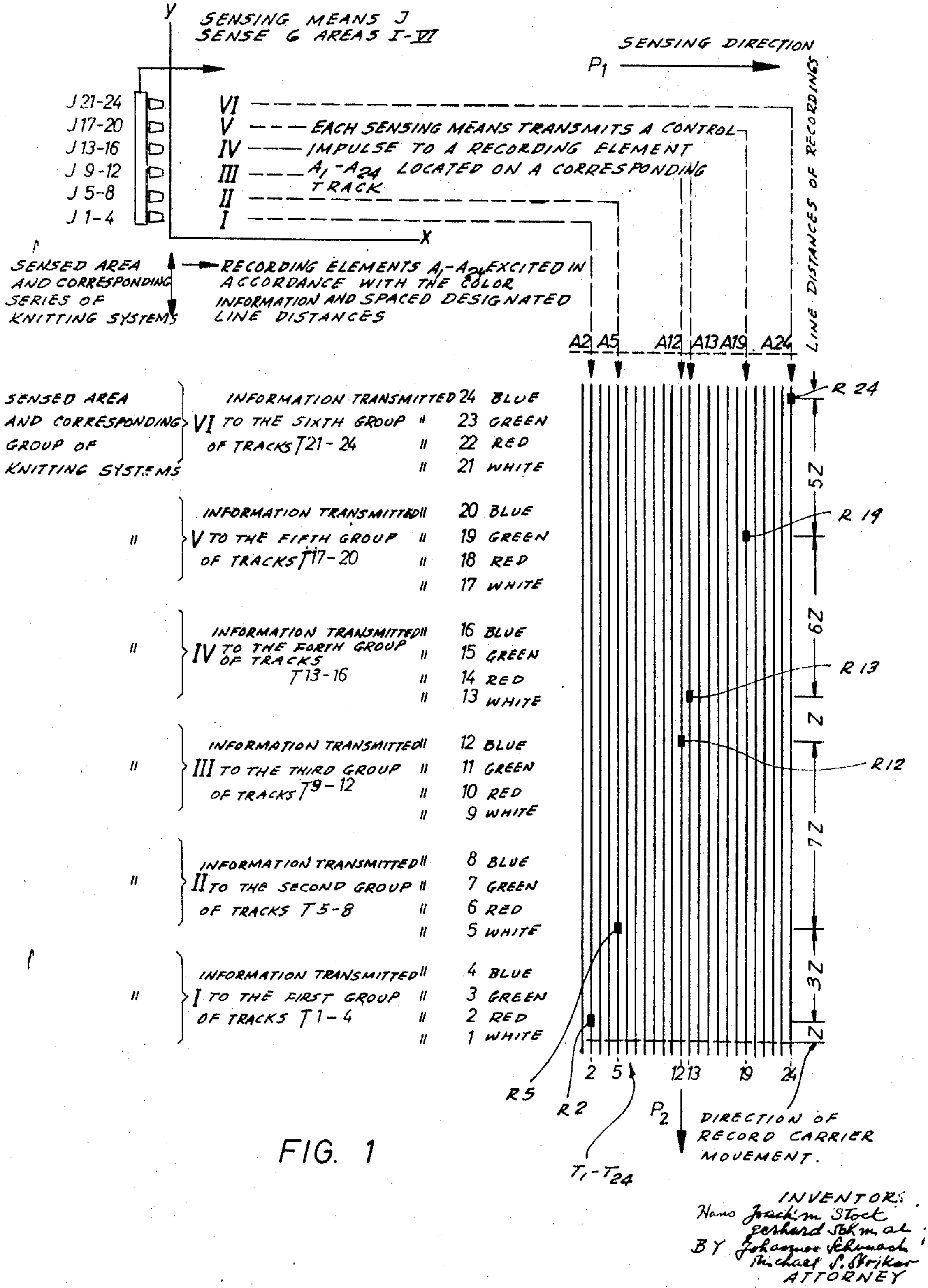
FIG. 1 is a diagram schematically illustrating a method of the invention for making a program tape adapted to control a circular knitting machine having 24 knitting stations during knitting of a fabric having four different colors.

As is apparent from FIG. 1, the recording elements A1 to A24 are also transversely spaced in axial direction of the drum so as to define 24 parallel longitudinal tracks T1 to T24 on the record carrier tape S*t*. As also shown in the diagram of FIG. 1, the sensing means J1–4, which senses line I of the sample pattern, and the associated recording means A1–4 are associated with a first group of tracks T1, T2, T3, T4 which are respectively associated with the colors white, red, green and blue and with recording elements A1, A2, A3, A4. Six groups of tracks are provided and respectively associated with the six sensing means and recording means. When six control impulses are produced by the six sensing means upon sensing six areas of the sample pattern, one recording element of each recording means, for example, recording element A2 of the first recording means, and recording element A5 of the second recording means, are energized as also shown in FIG. 3, by the control impulses, to make a recording on the program tape. As shown in FIG. 1, the recording R2 is made in portion I of the tape in the track representing the color red, and the recording R5 is made in the second portion II of the record carrier on track 5, associated with the color white and being a track of the second group of tracks T5–8. The other recordings R12, R13, R19, and R25 are placed in the same manner on the record carrier tape so that when the six areas are sensed, six recordings are made on a section of the record carrier tape which will permit the selector apparatus of the knitting machine to sense the six recordings, and to select the corresponding yarn carriers to supply yarns in the respective colors at the knitting systems when the record carrier is used for controlling a knitting machine having 24 knitting stations, of which groups of four have yarn carriers respectively associated with the colors white, red, green and blue. Each knitting station is fed a yarn of one color. For example, the 1st, 5th, 9th, 13th, 17th, and 21st knitting stations may operate with white yarns, the 2nd, 6th, 10th, etc. knitting stations may operate with red yarns and so forth.

The recordings may be holes punched by punches A1–A24, or areas of a photographic record carrier exposed by a recording element A1 to A24 which produces a flash of light when excited.

The record carrier tape is guided over guide rollers 102 to 105, and is shifted by a transmission between operating bar 101 and shaft B1 to place a new section of the record carrier blank on the periphery of drum B in the region of the recording elements A1 to A24 when operating bar 101 shifts the sensing means either in the direction X to sense six areas of the subsequent columns *b*, *c*, *d* and so forth, or shifts in the direction Y to sense other six areas in column *a* in the position 101'.

Assuming that the design is repeated after six columns *a* to *f* of sample pattern V, operating bar 101 and the sensing means are moved six steps in the direction X, and then returned to the initial position and shifted in the direction Y to sense the next six lines of the pattern while moving stepwise in the direction X. The width of the sample pattern in the direction X depends on the periodicity of the design. If the design pattern extends over the entire circumference of the knitting cylinder, a sample pattern must have in the direction X a greater width than if the design is repeated two or several times in a fabric about the circumference of the knitting cylinder. However, if yarns having four different colors are to be used for knitting the fabric, six lines of the sample pattern must be simultaneously sensed, irrespective of the periodicity of the pattern. Every time the sample pattern and the sensing means are shifted relative to each other to sense a new series of areas, the record carrier is shifted by a conventional transmission between operating bar 101 and shaft B1 to place a new blank section of the record carrier tape on the drum B in the region of the recording means. The periphery of drum B is engaged by the record carrier tape in a slippage free frictional engagement.

FIG. 4 shows one of the recording elements A19 located on the respective track T19 of the record carrier S*t*, and it will be understood that the other recording elements are staggered in axial and circumferential directions of the drum, as is apparent from the recordings shown in FIG. 1.

The electronic control means C receives in each sensing position six control impulses from the respective sensing elements which respond to the color of the respective sensed area, and the information is translated into control signals for energizing corresponding recording elements to produce a recording on the record carrier blank. FIG. 3 shows only six lines C' leading from control means C to the recording elements A2, A5, A12, A13, A19, and A24 of the respective six recording means A1–4, A5–8 and so forth which are respectively associated with the sensing means J1–4, J5–8 and so forth. Consequently, the recordings R2, R5, R12, R13, R19, and R24 are made in the location shown in FIG. 1 by the corresponding recording elements which are energized by the corresponding wires of the six output lines C', each of which has four wires associated with the four colors, respectively.

Referring now to FIG. 1, the top part illustrates the movement of the six sensing means J in the sensing direction X. Each of the six sensing means transmits the sensed information to the respective recording element. The recording elements are respectively associated with 24 tracks of the record carrier. The respective section of the record carrier on which the information concerning the first six areas is recorded, is divided into six portions I to VI respectively corresponding to the six lines I to VI of the sample pattern. Due to the fact that the recording elements are staggered in longitudinal and transverse directions of the record carrier, the information sensed in line I of the sample pattern is recorded in the first portion I of the record carrier, and since the first sensing means J1–4 is associated with the first recording means A1–4 whose recording elements respectively cooperate with the first groups of tracks T1–4, a recording representing the sensed area in line I of the sample pattern is made in the first portion I and on one of the tracks T1–T4. In the particular case in which the sensed area in line I of the sample pattern is red, a recording is made by recording element A2 on track T1.

The other recordings R5, R12, R13, R19, and R24 are made in the same manner in the respective associated portions II to VI of the record carrier within the respective associated groups of tracks, and in the track of the group determined by the color sensed by the respective sensing element.

Figure 2:
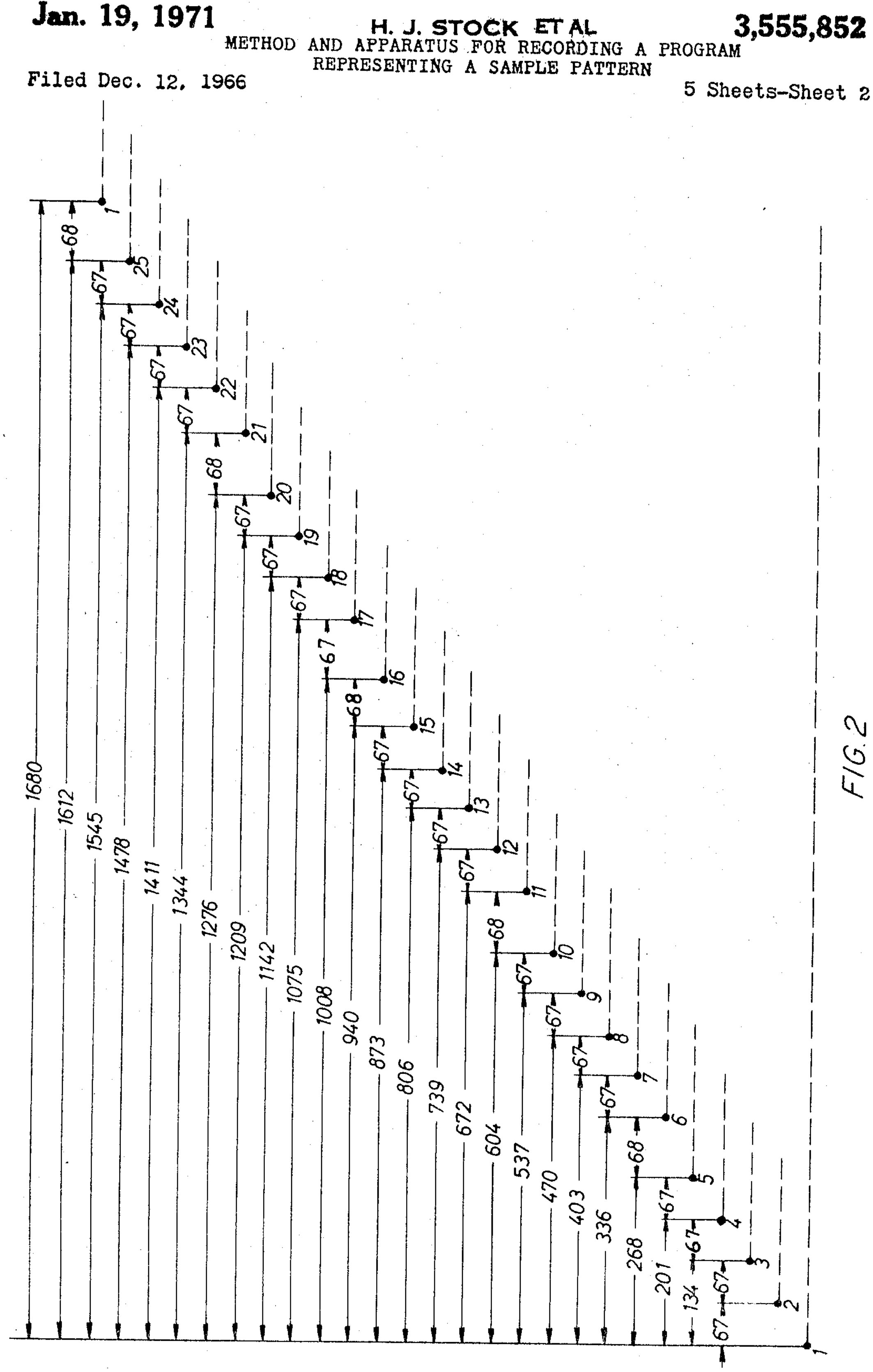
FIG. 2 is a diagram illustrating the distribtuion of the cylinder needles of a circular knitting machine over 24 knitting systems.

FIG. 1 also shows the distances between the transverse record carrier lines. Z is the number of needles between knitting systems. As shown in FIG. 2, which assumes a circular knitting machine to have 1680 knitting needles, 68 needles are provided between the knitting systems 5 and 6, 10 and 11, 15 and 16, 20 and 21. Sixty-seven needles are disposed between the remaining systems. The twenty-four knitting systems are indicated by the numerals 1 to 24 in FIG. 2, and point 25 does not represent a knitting system or a yarn carrier for feeding a yarn, but a point at which synchronizing impulses are produced for synchronizing the movement of the read out program tape with the rotation of the needle cylinder. In order to provide room for synchronizing means 25, sixty-seven + one, which are sixty-eight needles are disposed between knitting systems 24 and 1. The synchronizing during the reading out of the program tape produced in accordance with the present invention, has no bearing on the method and apparatus of the invention, and need not be further discussed. The control of the knitting machine by a program tape made in accordance with the present invention is only explained in order to facilitate the understanding of the manner in which the recordings are positioned in accordance with the present invention on a record carrier.

If in a knitting system, for example in knitting system 1, the needle which arrives at the knitting point is the first needle, then the needle which passes the knitting point at the same time in the second knitting system is the sixty-eighth needle.

The recording elements A1 to A24 are disposed about the periphery of drum B at distances from each other which correspond to the distances between the knitting systems about the periphery of the needle cylinder. The circumferential distances between the recording elements is determined by the number of transverse record carrier lines. For example, if there is a distance corresponding to 67 needles between the first and second knitting systems of the needle cylinder, then the recording elements A1 and A2 are spaced 67 record carrier lines. The length of the section of the record carrier tape, which is supported on drum B and cooperates with the twenty-four recording elements, is selected so that the supported section of the record carrier tape has 1680 record carrier lines.

Referring again to FIG. 1, the first group of tracks T1–4 corresponds to four knitting systems forming a row of loops in the knitting machine which is to be controlled by the finished program tape. The four tracks of this group, as well as the tracks of the other groups, are respectively associated with the colors white, red, green and blue. Consequently, the recording elements A1, A2, A3, A4 receive control impulses containing the information white, red, green or blue so that the respective recording elements produce recordings on the respective track T1, T2, T3, or T4. The same is true for the second group of knitting systems which is controlled by the second group of tracks T5–8 on which recordings are produced by recording elements A5–8.

Referring again to FIG. 3, the six sensing means J sense the information which is to be recorded in the six groups of tracks by a recording element forming a part of six recording means. Sensing means J1–4 produces a recording representing the sensed color in the first group of tracks T1–4, sensing means J5–8 is associated with the second group of tracks, sensing means J9–12 is associated with the third group of tracks, sensing means J13–16 is associated with the fourth group of tracks, sensing means J17–20 is associated with the fifth group of tracks, and sensing means J21–24 is associated with the sixth group of tracks.

In the position shown in FIGS. 1 and 3, a series of six areas having the colors red, white, blue, white, green and blue are sensed, and one sensing element J2 of sensing means J1–4 transmits a control impulse representing the information "red" to the recording means A1–4 where the respective recording element A2 is selected by the electronic control means C so that a recording representing red is made in the second track T2.

The information "white" sensed by sensing means J5–8 is transmitted to the second recording means A5–8, and more particularly to the recording element A5 representing white to make a recording R5.

Sensing means J9–12 senses blue, and the respective information is recorded by recording element A12 on track T12. Sensing means J13–16 senses "white" and causes energization of recording element A13 which produces a recording on track 13 in the portion IV of the fourth recording means A13–16.

Sensing means J17–20 senses "green" by sensing element J2 of and controls the fifth recording means A17–20, of which recording element 19 is connected by control means C, to make a recording R19 in track T19 in portion V of the record carrier.

Sensing means J21–24 senses "blue" and causes a recording by recording element 24 in track T24 which belongs to the sixth group of tracks, and which is located in the sixth portion VI of the record carrier section.

The recording elements A1, A5, A9, A13, A17, A21 are respectively associated with the color "white" and produce recordings which, when read out during the operation of the circular knitting machine, will cause the simultaneous feeding of white yarns at the corresponding knitting systems of the circular knitting machine.

Recording elements A2, A6, A10, A14, A18, A22 are respectively associated with the color "red," and the recordings made in the respective corresponding tracks of the record carrier will cause the feeding of six red yarns at six knitting systems of the circular knitting machine when the tape is read out during the operation of the knitting machine.

The recording elements A3, A7, A11, A15, A19, A23 are associated with the color "green" and produce recordings which, when read out, will cause the feeding of green yarns.

Recording elements A4, A8, A12, A16, A20, A24 are associated with the color "blue" and will produce recordings which will control the feeding of six blue yarns to six knitting systems of the knitting machine.

Each of the 24 tracks is associated with a specific color so that the respective tracks cause the feeding of yarns having the respective colors.

Assuming that the knitting systems of the circular knitting machine are numbered 1 to 24, tracks 1, 5, 9, 13, 17, 21 control the correspondingly numbered knitting system to knit a white yarn, the tracks 2, 6, 10, 14, 18, 22 control the correspondingly numbered knitting systems to knit a red yarn, the tracks 3, 7, 11, 15, 19 and 23 control the correspondingly numbered knitting system to knit a green yarn, and tracks 4, 8, 12, 16, 20, 24 control the correspondingly numbered knitting system to knit with a blue yarn.

Every time the operating means 101 shifts the sensing means one step in the direction X relative to the sample pattern V, drum B is turned a corresponding angle by shaft B1. All the information which is sensed column by column in the direction X, appears on the program tape in the form of recordings spaced in longitudinal and transverse directions of the program tape and representing by the position thereof, the sensed information so that the knitting machine is correspondingly controlled when the program tape is read out.

In accordance with the invention, the record carrier has as many tracks as there are devices controlled in a machine when the recordings of the finished record carrier, such as program tape, are read out. The devices may form loops, which is accomplished by the knitting systems of a circular knitting machine, or the heddle means of a loom will produce fabric elements of crossing warp and weft yarns, or the devices which in warp looms form the loops on the needles of the needle bar will be operated.

It is assumed that each of these devices produces fabric elements which correspond to the sensed areas of a sample pattern. The fabric elements may distinguish from each other by different colors, or by the manner in which the yarns are arranged in a relief pattern.

Each recording on a transverse record carrier line corresponds to a loop formed by a corresponding knitting system of a circular knitting machine, for example. In looms, each record carrier line corresponds to a row of yarn crossings between the warp yarns and one weft yarn. In a warp loom, each record carrier line corresponds to the tying of the warp yarns on the needles of the needle bar.

It is assumed that during each cyclical operation of the machine, for example within the time *t* of one revolution of a circular knitting machine divided by the number of needles, the record carrier is shifted one line. A corresponding shifting takes place after each pick of a loom, and after each loop-forming cycle of the needle bar of a warp knitting machine.

Referring particularly to a knitting machine, since each wale is knitted on a single needle, it is necessary that six sensed areas located in a row in a column of the sample pattern, and associated with a needle wale having six loops, produce recordings which are not only located on six different tracks, but also in six different lines of the record carrier.

In this manner it is accomplished that when the record carrier made in accordance with the invention is used for controlling the knitting needles, the newly formed loop of a needle wale is followed by a loop made by a knitting system following the knitting system of the first loop in the direction of rotation of the needle cylinder. The following knitting system must be one of the next following group of four knitting systems which are required for knitting a row of loops comprising four yarns. In the direction of rotation of the needle cylinder, always groups of four knitting systems in succession, that is six groups of needle systems cooperate to form each course. When a loop is formed in the first group of knitting systems, the next following loop is formed on the same needle in the next group of knitting systems, and more particularly in the knitting system of the respective following group whose yarn carrier feeds the yarn of the color corresponding to the color of the sensed area of the sample pattern.

For example, if the sample pattern requires during the first sensing step of the knitting machine, the knitting of a needle wale consisting of six green loops, the first sensed green area of the sample pattern associated with the first knitting system in which a green yarn is fed, namely the third knitting system of the first group of four knitting systems, controls the operation by means of a recording on the third track of the record carrier.

The second green loop is produced by the "green" knitting system of the second group of four knitting systems, which is the seventh knitting system, and receives the control command from the recording on the seventh track which is spaced four times Z record carrier lines from the record carrier lines whose recording controls the formation of the first green loop.

The third green loop is knitted on the same needle as the first and second green loops by the "green" system of the third group of four systems, which is the eleventh knitting system and receives a command impulse from a recording on the eleventh track which is spaced four times Z record carrier lines from the record carrier line whose recording controls the formation of the second green loop.

The fourth, fifth and sixth green loops are made by the fourth, fifth and sixth group of knitting systems by the fifteenth, nineteenth and twenty-third system, respectively on the same needle, and receive the necessary control signals from recordings located in the fifteenth, nineteenth and twenty-third track. The record carrier line on which the respective recording is located, is always four times Z recording carrier lines spaced from the preceding record carrier line which was used for controlling the formation of the preceding loop. Evidently, the distances between record carrier lines having successive recordings are different if the colors change in the respective needle wale so that different knitting systems are used for forming successive loops in needle wales of the same needle. Z is the number of needles provided between two successive knitting systems on the needle cylinder.

In order to obtain the proper control of the machine when the record carrier made in accordance with the invention is read out, it is necessary that six simultaneously sensed informations are distributed over six tracks and six lines of the record carrier.

As explained above, the distribution over different tracks is dependent on the distinguishable characteristic of the area of the sample pattern sensed by the sensing means, which may be a color. The distribution is also dependent on which of the six areas simultaneously sensed controls the placement of the recording. As explained above, it is preferred that each of six adjacent sensed areas, is associated with a corresponding group of tracks having four tracks. The information represented by the first sensed area of a group of six simultaneously sensed areas, is recorded in the first group of four tracks, and more particularly in the track associated with the sensed color. The information of the second sensed area is transformed in a recording in the second group of four tracks on the respective track associated with the sensed color, and so forth. The distribution over the lines of the record carrier is thus that recordings respectively associated with the simultaneously sensed areas, are spaced from each other in the direction of the tracks a number of record carrier lines obtained by subtraction of the first system number from the second system number multiplied by Z.

Assuming that the lowest sensed area is green, and the recording for the first group of knitting systems is made on track T3 in line 1, a second red sensed area produces a recording on track T6 for the second group of four knitting systems, and the distance between the lines is $(6-3)Z$.

If the first sensed area of six areas related to a needle wale having six differently colored loops, is white, the first line of the record carrier receives a recording in the track of the first group of four tracks associated with the color white corresponding to the first group of four knitting systems.

If the second sensed area is red, a recording is made on the red track on the second group of tracks, which is track T6, and on a line which is $(6-1)Z$ lines spaced from the first line.

If the third sensed area is blue, the corresponding "blue" track in the third group of tracks receives a recording, which is track T12, and the recording is spaced from the line on which the recording for the red preceding loop is located, a distance which is equal to the difference between the number of the tracks and knitting systems on which the blue recording is located, namely 12, and the track and system number of the preceding red recording, namely 6, multiplied by Z, which is $(12-6)Z$.

From the above it will become apparent that all recordings which simultaneously control the operation of a needle when passing a knitting system, are located on the same section of the record carrier.

It is evident that the arrangement of the present invention can be adapted to knitting machines having a different number of knitting systems for making knitted fabrics of a different number of colored yarns. Reference has been made to different colors of the sample pattern, and it will be appreciated that instead of different colors, different shades of the same color, or other distinguishable characteristics may be used, as long as the sensing means are adapted to distinguish between different areas. Instead of a design comprising stitches of different colors, a design in which the loops are connected by different bindings can be produced by controlling the needles.

It will be understood that each of the elements described above, or two or more together, may also find a useful application in other types of methods of making a program tape differing from the types described above.

While the invention has been illustrated and described as embodied in a method and apparatus for automatically recording on a record carrier a program represented by a sample pattern in such a manner that a textile machine can be controlled by the record carrier to produce a corresponding pattern, it is not intended to be limited to the details shown, since various modifications and structural changes may be made without departing in any way from the spirit of the present invention.

Wtihout further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for automatically recording a program in accordance with a sample pattern having a plurality of areas arranged in crossing lines and columns, said areas having a plurality of different distinguishable characteristics, comprising a series of photoelectric sensing means arranged in the direction of said columns for simultaneously sensing a series of said areas in a series of lines of said sample pattern, each of said photoelectric sensing means including a plurality of pulse generator elements equal to said plurality of characteristics, said pulse generator elements being responsive to the same, respectively, so that each photoelectric sensing means generates a control impulse when a pulse generator element thereof senses the respective characteristic; supporting means for supporting a record carrier; a series of recording means having the same number as said series of photoelectric sensing means, each recording means including a number of recording elements equal to the number of said pulse generator elements, said recording elements being electrically connected with said pulse generator elements, respectively, for receiving said control impulses from the same so that each recording element of each recording means is associated with one of said characteristics, said recording means being spaced in the read out direction of said record carrier, and said recording elements of each recording means being spaced from each other in said read out direction and in a direction transverse to the same and being located on parallel tracks of said record carrier extending in said read out direction so that the recordings produced under control of different photoelectric sensing means and corresponding recording means are simultaneously recorded on different tracks.

2. An apparatus as defined in claim 1 for producing a record carrier for controlling the needle operations of a circular knitting machine having 24 knitting stations including feeding means for feeding four yarns having different colors or shades in the same sequence, wherein said recording elements record on 24 tracks of said record carrier consisting of six groups of tracks, each group of tracks consisting of four tracks respectively associated with said four colors; wherein each series of photoelectric sensing means has six sensing means for simultaneously sensing six areas of six lines of said pattern in each column; wherein each sensing means has four pulse generator elements; wherein each series of recording means has six recording means; wherein each recording means has four recording elements; and wherein recordings made by recording elements associated with the same color but being part of different recording means, are located on corresponding tracks of different groups of said tracks.

3. An apparatus as defined in claim 1 for producing a record carrier for controlling the needle operations of a circular knitting machine having N knitting stations including feeding means for feeding $n$ yarns having different colors or shades in the same sequence, wherein said recording elements record on N tracks of said record carrier consisting of $N/n$ groups of tracks, each group of tracks consisting of $n$ tracks respectively associated with said $n$ colors; wherein each series of photoelectric means has $N/n$ sensing means for simultaneously sensing $N/n$ areas of $N/n$ lines of said pattern in each column; wherein each sensing means has $n$ pulse generator elements; wherein each series of recording means $N/n$ recording means; wherein each recording means has $n$ recording elements; wherein recordings made by recording elements associated with the same color but being part of different recording means, are located on corresponding tracks of different groups of said tracks; and wherein $n$, N, and $N/n$ are integers.

4. An apparatus as defined in claim 1 and comprising operating means for moving said sensing means and said sample pattern relative to each other in the direction of said lines for sensing in each column of said pattern a series of areas by said series of sensing means until all columns associated with a periodical pattern are sensed, and for moving said sensing means and said pattern thereupon relative to each other in line and column direction to a relative position in which other series if areas of said columns are sensed in line direction by said series of sensing means; and drive means for moving said record carrier to a different recording position whenever said sensing means and said sample pattern are moved to a different relative position.

5. An apparatus as defined in claim 4 wherein said record carrier is a tape; wherein said supporting means support a predetermined section of said tape; wherein said drive means are operable for placing successive sections of said tape on said supporting means; and wherein said recording means of said series are located opposite said supporting means and the tape section supported thereon for simultaneously recording on said tape.

6. An apparatus as defined in claim 5 wherein said supporting means includes a rotary drum; wherein said tape section is supported on the periphery of said drum; wherein said recording means and recording elements are angularly spaced from each other about said periphery of said drum; wherein said tracks of said tape extend in circumferential direction of said drum; and wherein said recording elements of each recording means are spaced in axial direction of said drum so that successive recording elements are staggered in axial and circumferential directions of said drum.

7. An apparatus as defined in claim 6 wherein said drive means are connected with said operating means to transport said tape to a position in which another tape section is loacted opposite said recording means whenever said operating means change the relative position of said sensing means and said sample pattern.

8. Method of recording information regarding color and other distinguishable characteristics on a record carrie for controlling the operations of a knitting machine having N knitting stations, each successive group of $n$ knitting stations controlling $n$ different yarns having different colors or other distinguishable characteristics; comprising making a sample pattern having areas arranged in crossing lines and columns, said areas having $n$ different colors or other distinguishable characteristics correlated with said yarns, respectively; photoelectrically sensing $N/n$ lines of said areas of said sample pattern successively in successive columns of said areas of said sample pattern; generating $N/n$ sensing impulses representing said colors or characteristics of said $N/n$ sensed areas, respectively; placing N recording elements on N transversely spaced tracks of a record carrier, respectively, in longitudinally and transversely spaced positions; and controlling by said $N/n$ control impulses groups of $N/n$ recording elements so that only one recording element of each group makes a recording whereby $N/n$ longitudinally spaced recordings are made on $N/n$ tracks each of which is one of a group of $n$ tracks which are associated with said different colors or characteristics, respectively, each group of $n$ tracks being associated with a group of $n$ knitting stations, and the $n$ tracks of each group being associated with $n$ different yarns, and wherein N, $n$, and $N/n$ are integers greater than one.

9. The method of claim 8 wherein said knitting machine is a circular knitting machine having 1680 cylinder needles; wherein N is twenty-four, $n$ is four, and $N/n$ is six, so that said recordings are distributed over 1680 lines of said record carrier.

References Cited

UNITED STATES PATENTS

| | | | |
|---|---|---|---|
| 2,158,536 | 5/1939 | Fisher et al. | 66—50 |
| 2,173,488 | 9/1939 | Tandler et al. | 66—50 |
| 2,225,842 | 12/1940 | Page | 66—50 |
| 2,845,096 | 7/1958 | Pasquet | 346—33 UX(MCR) |
| 2,857,969 | 10/1958 | Johnston | 234—89UX |
| 3,059,843 | 10/1962 | Corbaz | 234—58 |
| 3,090,550 | 5/1963 | Servillat | 234—89X |
| 3,130,903 | 4/1964 | Perry, Jr. et al. | 234—89X |
| 3,319,881 | 5/1967 | Loflen | 234—67X |
| 3,176,141 | 3/1965 | Siegmund | 250—226X |
| 3,302,874 | 2/1967 | Gruber | 234—128X |

FOREIGN PATENTS

| | | | |
|---|---|---|---|
| 318,972 | 1/1931 | Great Britain | 139—319 |
| 686,534 | 1/1959 | Great Britain | 234—59 |

WM. CARTER REYNOLDS, Primary Examiner

U.S. Cl. X.R.

66—50; 234—89, 131; 250—226; 346—33